United States Patent
Ramachandran

(10) Patent No.: US 10,386,242 B2
(45) Date of Patent: Aug. 20, 2019

(54) ANALOG TEMPERATURE SENSOR FOR DIGITAL BLOCKS

(71) Applicant: Texas Instruments Incorporated, Dallas, TX (US)

(72) Inventor: Ashwin Ramachandran, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 389 days.

(21) Appl. No.: 14/860,242

(22) Filed: Sep. 21, 2015

(65) Prior Publication Data
US 2017/0082500 A1    Mar. 23, 2017

(51) Int. Cl.
G01K 7/01 (2006.01)
(52) U.S. Cl.
CPC .................. G01K 7/01 (2013.01)
(58) Field of Classification Search
CPC ........................................ G01K 7/01
See application file for complete search history.

(56) References Cited

U.S. PATENT DOCUMENTS

| | | | | |
|---|---|---|---|---|
| 5,639,163 A * | 6/1997 | Davidson | .............. | G01K 7/01 327/512 |
| 7,149,645 B2 * | 12/2006 | Mangrulkar | .......... | G01K 3/005 702/130 |
| 8,044,702 B2 * | 10/2011 | Niederberger | .......... | G01K 7/01 327/513 |
| 8,756,549 B2 * | 6/2014 | Graf | .................... | H05B 1/0227 324/537 |
| 9,098,097 B2 * | 8/2015 | Tadinada | ................. | G05F 5/00 |
| 9,719,861 B2 * | 8/2017 | Ramaraju | ............... | G01K 7/01 |
| 9,726,696 B2 * | 8/2017 | Powell | .............. | G01R 19/0069 |
| 2015/0276497 A1 * | 10/2015 | Miyazaki | ................ | G01K 7/01 374/170 |

OTHER PUBLICATIONS

Kester et al, "Practical Design Techniques for Sensor Signal Conditioning", Analog Devices, 1999, chapter 7 pp. 19-21.*

* cited by examiner

*Primary Examiner* — Clayton E. LaBalle
*Assistant Examiner* — Leon W Rhodes, Jr.
(74) *Attorney, Agent, or Firm* — Ebby Abraham; Charles A. Brill; Frank D. Cimino

(57) ABSTRACT

The disclosure provides a circuit that includes an analog control block, and a plurality of temperature sensors coupled to the analog control block. At least one temperature sensor of the plurality of temperature sensors includes a first transistor coupled to a first current source. A second transistor is coupled to a second current source and to the first transistor. The analog control block measures a local temperature from a first potential generated across the first transistor and from a second potential generated across the second transistor.

20 Claims, 4 Drawing Sheets

ANALOG TEMPERATURE SENSOR FOR DIGITAL BLOCKS

TECHNICAL FIELD

The present disclosure is generally related to temperature sensors, and more particularly to a temperature sensor designed as a standard digital cell.

BACKGROUND

Due to a remarkable growth of portable systems, the demand for low-cost but high performance temperature sensors is on an increasing trend. The important applications of temperature sensors includes the following, but not limited to, (a) power consumption control in integrated chips that includes a processing unit; (b) thermal compensation in application specific integrated circuits; (c) local temperature monitoring in fabrication factories; and (d) temperature control in automobiles and consumer electronic devices.

In addition to low cost and high performance, the power consumption of temperature sensors should be as low as possible to be applicable to the battery-powered portable systems. Furthermore, with low power consumption, the error caused by self-heating will be reduced and the power consumption of the integrated chips will not be significantly increased.

A heat map of an integrated chip illustrates the heat generated and the corresponding temperature in different parts of the integrated chip. Generally, the area around a processing unit or logic unit is the hottest region or hot spot. In a typical integrated chip, there are multiple hot spots. However, owing to a large area of existing temperature sensors, they are placed quiet far away from the hot spot(s). This results in a temperature gradient which can be as high as +/−15° C.

In addition, the temperature gradient is not constant, which further degrades the performance of the existing temperature sensors since a maximum temperature threshold is required to be kept low to account for the temperature gradient. The variation in the temperature gradient may be caused by local hot spots within the processing unit.

Thus, a number of temperature sensors that can be used on the integrated chip are limited because of the large size of the existing temperature sensors. Also, efficient thermal management on the integrated chip is not possible because of the degraded performance of the existing temperature sensors.

The existing temperature sensors also suffer from noise isolation and high process spread. In addition, there are very strict requirements on reference voltage levels and reference current levels. A poor correlation exists between individual temperature sensors which makes it difficult to use multiple temperature sensors on the integrated chips.

The commonly used existing temperature sensor includes time-to-digital converter based CMOS sensors and CMOS gate leakage based sensors. These CMOS sensors have poor linearity and high process spread. In addition, the CMOS sensors are supply sensitive and also susceptible to noise.

SUMMARY

According to an aspect of the disclosure, a circuit is disclosed. The circuit includes an analog control block, and a plurality of temperature sensors coupled to the analog control block. At least one temperature sensor of the plurality of temperature sensors includes a first transistor coupled to a first current source. A second transistor is coupled to a second current source and to the first transistor. The analog control block measures a local temperature from a first potential generated across the first transistor and from a second potential generated across the second transistor.

BRIEF DESCRIPTION OF THE VIEWS OF DRAWINGS

DETAILED DESCRIPTION OF THE EMBODIMENTS

Figure 1:
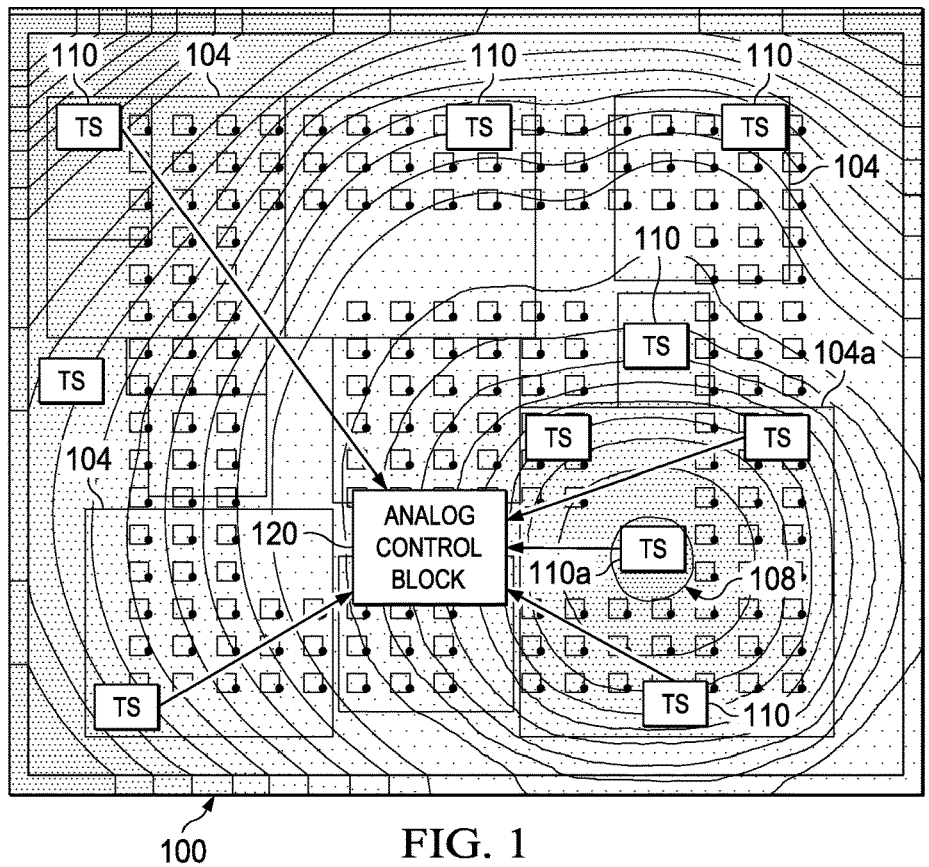
FIG. 1 is a block diagram of an integrated chip, according to an embodiment.

FIG. 1 is a block diagram of an integrated chip 100, according to an embodiment. The integrated chip 100 includes one or more digital blocks illustrated as 104. The digital blocks can be any of the following, but not limited to, processing unit, logic unit, memory modules, testers and interfacing devices. The integrated chip 100 also includes a plurality of temperature sensors illustrated as temperature sensor (TS) 110. The plurality of temperature sensors are coupled to an analog control block 120.

The integrated chip 100 also includes a first digital block 104a. The first digital block 104a in one example is a processing unit. The heat generated by the first digital block 104a is represented as 108. The regions similar to region 108 on the integrated chip are termed as hot spots. Thus, hot spots are the hot regions on the integrated chip 100 where a large amount of heat is generated by neighboring digital blocks. Each temperature sensor (TS) 110 of the plurality of temperature sensors is designed as a standard digital cell. This enables to place a temperature sensor (TS) 110 at hot spots.

In one example, at least one temperature sensor (TS) 110 of the plurality of temperature sensors includes a first transistor and a second transistor. In one version, each of the first transistor and the second transistor is a diode-connected PNP transistor. The first transistor is coupled to a first current source, and the second transistor is coupled to a second current source. A local temperature is measured from a first potential generated across the first transistor and from a second potential generated across the second transistor.

The local temperature is a temperature of a region in which the temperature sensor (TS) 110 is placed. For example, a first temperature sensor (TS) 110a is coupled to the first digital block 104a. The analog control block 120 measures the local temperature of the first digital block 104a from the first potential and the second potential generated across the first temperature sensor (TS) 110a. Thus, the temperature of the region 108 is measured by the analog control block 120.

The diode-connected PNP transistors are designed as standard core cell which allows easy integration with the one or more digital blocks. The temperature sensor (TS) 110 is designed as a standard digital cell that uses only low level metals. This relaxes the routing constraints of the temperature sensor (TS) 110. The design of the temperature sensor (TS) 110 as standard digital cell makes it compatible with digital placement and routing tools.

In addition, the temperature sensor (TS) 110 is small in size which allows placement of the temperature sensor (TS) 110 at hot spots. Also, the temperature sensor (TS) 110 can be integrated with a digital block 104 with ease. Thus, the temperature sensor (TS) 110 provides an accurate measurement of the local temperature. A large number of these temperature sensors can be used to generate a heat map of the integrated chip 100.

The temperature sensor (TS) 110 does not require a separate power supply. The temperature sensor (TS) 110 can be connected to a common ground which is used by the digital blocks 104. The first potential and the second potential generated at the temperature sensor (TS) 110 are provided to the analog control block 120. The analog control block 120 uses a difference in the first potential and the second potential to generate a digital code. The digital code is used to calculate the local temperature. In one example, a look-up table is used to calibrate the digital code and the local temperature.

In one example, the analog control block 120 includes a multiplexer which time multiplexes the potential (the first potential and the second potential) obtained from the plurality of temperature sensors. The operation of the temperature sensor (TS) 110 and the analog control block 120 are further illustrated later in the description.

Figure 2:
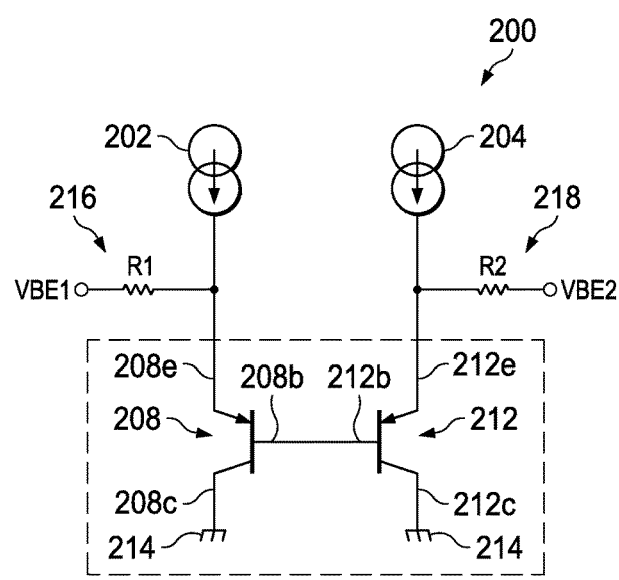
FIG. 2 illustrates a temperature sensor, according to an embodiment.

FIG. 2 illustrates a temperature sensor 200, according to an embodiment. The temperature sensor includes a first current source 202, a second current source 204, a first transistor 208 and a second transistor 212. The first transistor 208 is coupled to the first current source 202. The second transistor 212 is coupled to the second current source 204 and the first transistor 208. In one example, each of the first transistor 208 and the second transistor 212 is a diode-connected PNP transistor.

The first transistor 208 has an emitter terminal 208*e*, a base terminal 208*b* and a collector terminal 208*c*. The second transistor 212 has an emitter terminal 212*e*, a base terminal 212*b* and a collector terminal 212*c*. The base terminal 208*b* of the first transistor 208 is coupled to the base terminal 212*b* of the second transistor 212. The collector terminal 208*c* of the first transistor 208 and the collector terminal 212*c* of the second transistor 212 are coupled to a ground terminal 214.

The operation of the temperature sensor 200 illustrated in FIG. 2 is explained now. The first current source 202 and the second current source 204 pumps current in the first transistor 208 and the second transistor 212 respectively. In one version, the first current source 202 and the second current source 204 are included in an analog control block which is coupled to the temperature sensor 200. The analog control block is similar to the analog control block 120 illustrated in FIG. 1.

A first potential VBE1 216 is generated across the first transistor 208, and a second potential VBE2 218 is generated across the second transistor 212. The first potential VBE1 216 is generated across the emitter terminal 208*e* and the base terminal 208*b* of the first transistor 208. The first potential VBE1 216 is measured through a first resistor R1. The second potential VBE2 218 is generated across the emitter terminal 212*e* and the base terminal 212*b* of the second transistor 212. The second potential VBE2 218 is measure through a second resistor R2. The first resistor R1 and the second resistor R2, in one example, represent parasitic routing resistance of metal routes from the analog control block to the first transistor 208 and the second transistor 212 respectively.

A local temperature is measured from the first potential VBE1 216 and the second potential VBE2 218. In one example, the analog control block similar to the analog control block 120 is used to measure the local temperature from the first potential VBE1 216 and the second potential VBE2 218. The local temperature is a temperature of a region in which the temperature sensor 200 is placed. When the temperature sensor 200 is coupled to a digital block, the temperature sensor 200 is used to measure the local temperature of the digital block.

The first transistor 208 and the second transistor 212, in one example, are diode-connected PNP transistors which are designed as standard core cell. This allows easy integration of the temperature sensor 200 into a digital block. The design of the temperature sensor 200 as standard digital cell makes it compatible with digital placement and routing tools. In addition, the temperature sensor 200 is small in size as compared to conventional temperature sensors. This allows placement of the temperature sensor 200 at hot spots. Hot spots are the hot regions on an integrated chip where a large amount of heat is generated by neighboring digital blocks.

Also, the temperature sensor 200 can be integrated with a digital block with ease. Thus, the temperature sensor 200 provides an accurate measurement of the local temperature. A large number of these temperature sensors can be used to generate a heat map of the integrated chip.

Figure 3:
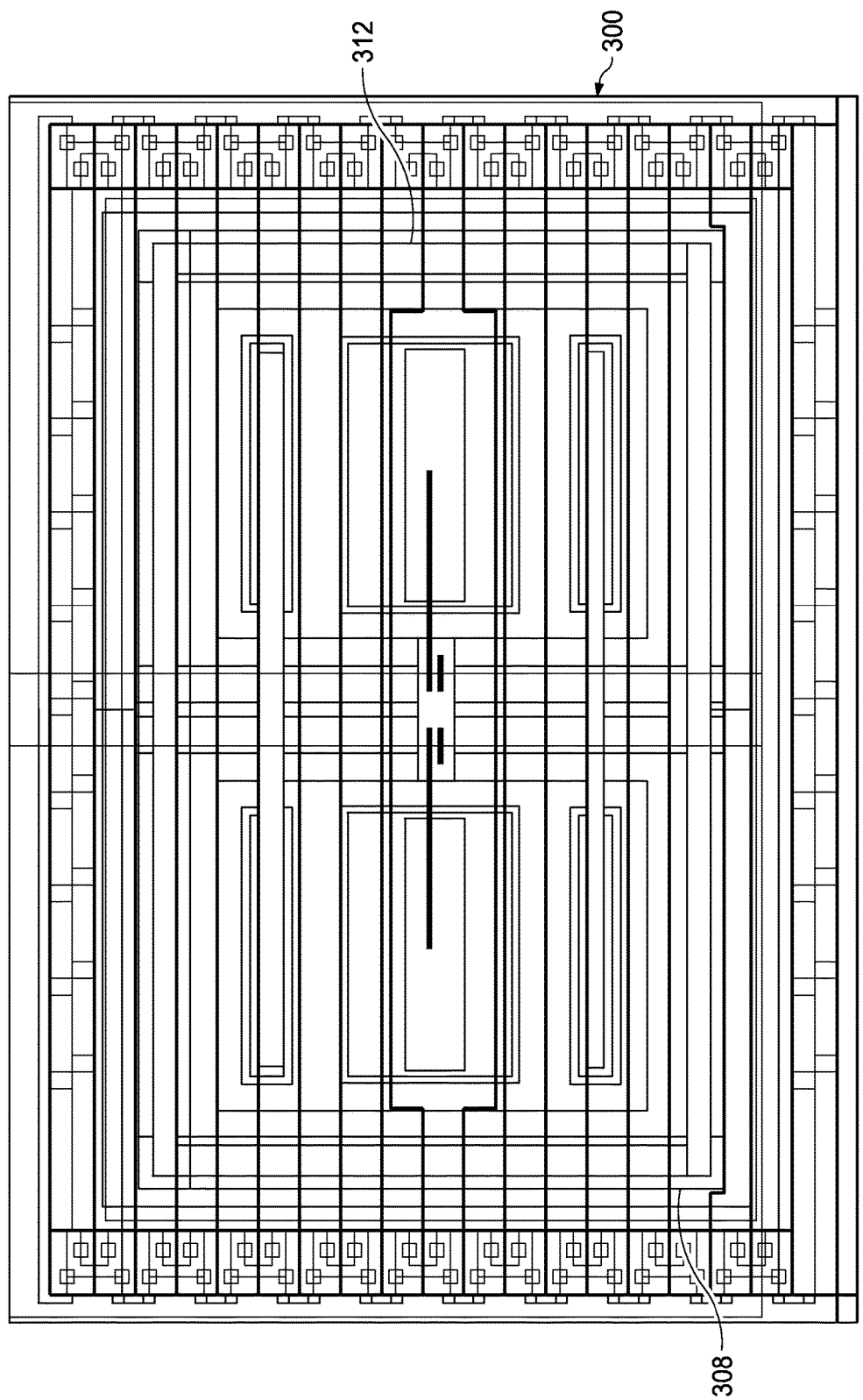
FIG. 3 illustrates a layout of a temperature sensor, according to an embodiment.

FIG. 3 illustrates a layout 300 of a temperature sensor, according to an embodiment. The layout 300 is explained in connection with the temperature sensor 200 illustrated in FIG. 2. The layout 300 illustrates a first transistor 308 and a second transistor 312. The layout illustrates that each of the first transistor 308 and the second transistor 312 is a diode-connected PNP transistor.

The first transistor 308 is similar in connection and operation to the first transistor 208, and the second transistor 312 is similar in connection and operation to the second transistor 212. The layout 300 illustrates that the temperature sensor, for example temperature sensor 200, is designed as a standard digital cell that uses only low level metals. This relaxes the routing constraints of the temperature sensor. The design of the temperature sensor as a standard digital cell makes it compatible with digital placement and routing tools.

The diode-connected PNP transistors 308 and 312 are designed as standard core cell which allows easy integration with one or more digital blocks. The layout 300 illustrates that the temperature sensor is small in size which allows placement of the temperature sensor at hot spots in an integrated chip. Thus, the temperature sensor provides an accurate measurement of a local temperature. The local temperature is a temperature of a region in which the temperature sensor is placed. When the temperature sensor is coupled to a digital block, the temperature sensor is used to measure the local temperature of the digital block.

A large number of these temperature sensors can be used to generate a heat map of the integrated chip, for example integrated chip 100. The temperature sensor illustrated in the layout 300 does not require a separate power supply. Hence, there is no leakage power. The temperature sensor can be connected to a common ground which is used by other digital blocks on the integrated chip. The diode-connected PNP transistors 308 and 312 are context friendly cells, and do not affect context sensitive low length transistors placed in the vicinity of these transistors. Thus, the diode-connected PNP transistors 308 and 312 do not affect functioning of low length transistors.

A first current source and a second current source pumps current in the first transistor 308 and the second transistor 312 respectively. The first current source and the second current source are included in an analog control block which is coupled to the temperature sensor illustrated in layout 300. The analog control block is similar to the analog control block 120 illustrated in FIG. 1.

A first potential VBE1 is generated across the first transistor 308, and a second potential VBE2 is generated across the second transistor 312. The first potential VBE1 is generated across the emitter terminal and the base terminal of the first transistor 308. The second potential VBE2 is generated across the emitter terminal and the base terminal of the second transistor 312.

The analog control block similar to the analog control block 120 is used to measure the local temperature from the first potential VBE1 and the second potential VBE2. The temperature sensor illustrated in layout 300 is coupled to an analog control block through four nets. A first net is used to provide current from the first current source in the analog control block to the first transistor 308. A second net is used to provide current from the second current source in the analog control block to the second transistor 312.

A third net is used by the analog control block to measure the first potential VBE1 is generated across the first transistor 308. A fourth net is used by the analog control block to measure the second potential VBE2 is generated across the second transistor 312. All four nets are routed with minimum spacing. Also, shield lines are used around the outermost nets of the four nets. In one version, the first transistor 308 and the second transistor 312 are vertical PNP transistors with an emitter active of size 2.5 µm×4 µm and a base region of size 6.5 µm×5 µm.

Figure 4:
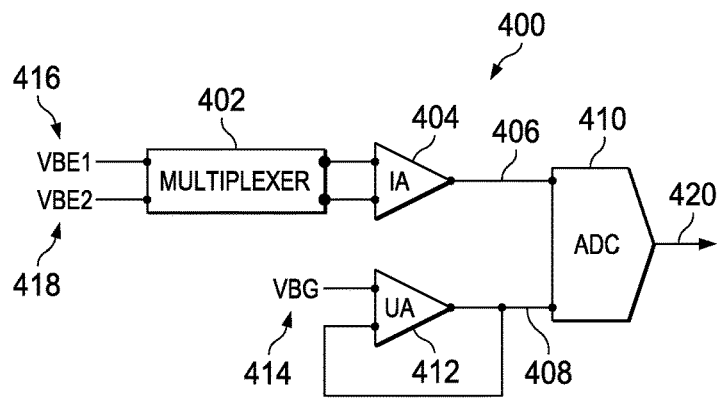
FIG. 4 illustrates an analog control block, according to an embodiment.

FIG. 4 illustrates an analog control block 400, according to an embodiment. The analog control block 400 includes a multiplexer 402, an instrumentation amplifier (IA) 404, a unity feedback amplifier (UA) 412 and an analog-to-digital converter 410. In one example, the analog control block 400 is coupled to one or more temperature sensors. In one version, the analog control block 400 is integrated on a same chip as the temperature sensors. In another version, the analog control block 400 is on a different chip as the temperature sensors.

The multiplexer 402 receives a first potential VBE1 416 and a second potential VBE2 418. In one example, the multiplexer 402 receives a first potential VBE1 416 and a second potential VBE2 418 from a temperature sensor for example, the temperature sensor 200 illustrated in FIG. 2. The first potential VBE1 416 is analogous to the first potential VBE1 216, and the second potential VBE2 418 is analogous to the second potential VBE2 218.

In another example, the multiplexer 402 receives the first potential and the second potential generated by multiple temperature sensors. The multiplexer time multiplexes the first potential and the second potential obtained from the one or more temperature sensors. The multiplexer 402 provides the first potential VBE1 416 and the second potential VBE2 418 generated by a temperature sensor to the instrumentation amplifier (IA) 404.

The instrumentation amplifier (IA) 404 measures a difference of the first potential VBE1 416 and the second potential VBE2 418. The instrumentation amplifier (IA) 404 amplifies the difference of the first potential VBE1 416 and the second potential VBE2 418 to generate an amplified voltage 406. The unity feedback amplifier (UA) 412 receives a band gap voltage VBG 414, and generates a reference voltage 408.

The ADC 410 is coupled to the instrumentation amplifier (IA) 404 and the unity feedback amplifier (UA) 412. The ADC 410 receives the amplified voltage 406 and the reference voltage 408. The ADC 410 converts the amplified voltage 406 to a digital code 420 using the reference voltage 408. The digital code 420 is used to measure a local temperature. In one example, a look-up table is used to calibrate the digital code 420 and the local temperature.

The local temperature is a temperature of a region in which the temperature sensor is placed. When the temperature sensor is coupled to a digital block, the local temperature measured by the analog control block 400 is the local temperature of the digital block. The operation of the analog control block 400 is further illustrated in connection with FIG. 5 and FIG. 6.

Figure 5:
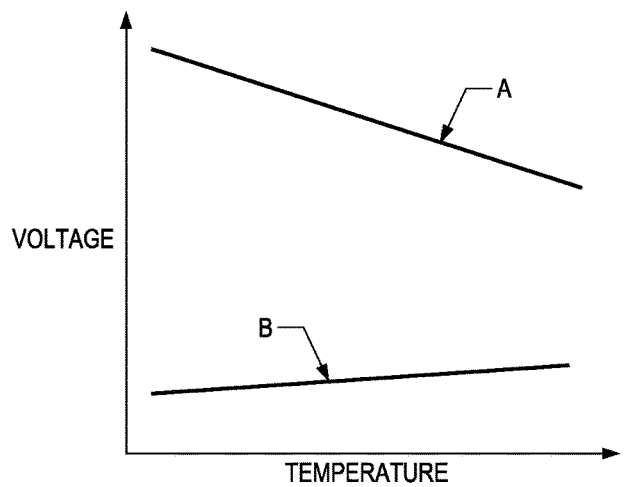
FIG. 5 illustrates operation of an analog control block, according to an embodiment.

FIG. 5 illustrates operation of an analog control block, according to an embodiment. The FIG. 5 is explained in connection with the analog control block 400 illustrated in FIG. 4 and the temperature sensor 200 illustrated in FIG. 2. Line A illustrates a first potential VBE1 and line B illustrates a differential potential ΔVBE. The first potential VBE1 is similar to the first potential VBE1 216, and ΔVBE represents the difference between the first potential VBE1 216 and the second potential VBE2 218.

The line A represents a relation between the voltage generated across the first transistor 208 which is VBE1 and the temperature. It is defined as $$VBE1 = \eta \frac{kT}{q} \ln\left(\frac{I}{Is}\right) \quad (1)$$

where η is an emission coefficient of the emitter base junction, k is Boltzmann's constant, q is the charge of a single electron, T represents absolute temperature, Is represents an emitter saturation current and I represents the current provided to the first transistor 208 by the first current source 202.

The second potential VBE2 218 is defined as $$VBE2 = \eta \frac{kT}{q} \ln\left(\frac{n*I}{Is}\right) \quad (2)$$

where, n*I is the current provided to the second transistor 212 by the second current source 204.

Thus, the differential potential illustrated in line B is defined as $$\Delta VBE = \eta \frac{kT}{q} \ln(n) \quad (3)$$

Equation 3 illustrates that the differential potential ΔVBE is directly proportional to the absolute temperature (T), which is also illustrated by line B. This differential potential ΔVBE is measured by an instrumentation amplifier, similar to IA 404, in the analog control block 400. The instrumentation amplifier amplifies the difference of the first potential VBE1 216 and the second potential VBE2 218 to generate an amplified voltage.

An analog-to-digital converter (ADC) is coupled to the instrumentation amplifier. The ADC receives the amplified voltage. The ADC converts the amplified voltage to a digital code. The digital code is used to calculate a local temperature. In one example, a look-up table is used to calibrate the digital code and the local temperature. The local temperature is a temperature of a region in which the temperature sensor, for example temperature sensor 200, is placed. When the temperature sensor is coupled to a digital block, the local temperature measured by the analog control block is the local temperature of the digital block.

Figure 6:
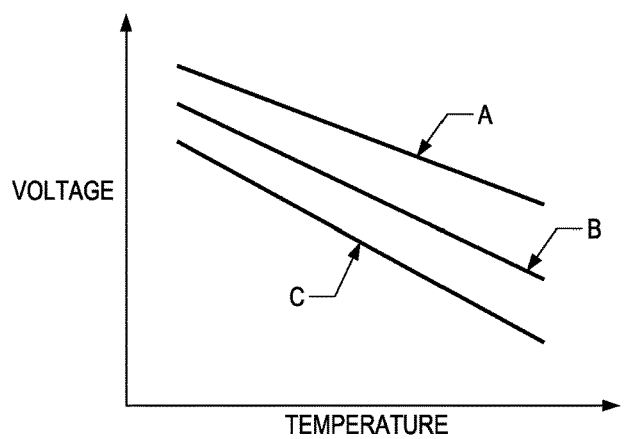
FIG. 6 illustrates operation of an analog control block, according to an embodiment.

FIG. 6 illustrates operation of an analog control block, according to an embodiment. The FIG. 6 is explained in connection with the analog control block 400 illustrated in FIG. 4 and the temperature sensor 200 illustrated in FIG. 2. Line A illustrates a first potential VBE1 and line B illustrates a second potential VBE2. Line C illustrates a third potential VBE3. The first potential VBE1 is generated across a first transistor when a first current is provided to the first transistor.

The second potential VBE2 is generated across a second transistor when a second current is provided to the second transistor. Similarly, the third potential is generated across the first transistor when a third current is provided to the first transistor. This is illustrated in connection with the temperature sensor 200. The first current is provided to the first transistor 208 to generate the first potential VBE1. This is illustrated in Line A, and defined as $$VBE1 = \eta \frac{kT}{q} \ln\left(\frac{n*I}{Is}\right) \quad (4)$$

where η is an emission coefficient of the emitter base junction, k is Boltzmann's constant, q is the charge of a single electron, T represents absolute temperature, Is represents an emitter saturation current and n*I represents the first current provided to the first transistor 208 by the first current source 202.

The second current is provided to the second transistor 212 to generate the second potential VBE2. This is illustrated in Line B and defined as $$VBE2 = \eta \frac{kT}{q} \ln\left(\frac{I}{Is}\right) \quad (5)$$

The third current is provided to the first transistor 208 to generate the third potential VBE3. This is illustrated in Line C and defined as $$VBE3 = \eta \frac{kT}{q} \ln\left(\frac{m*I}{Is}\right) \quad (6)$$

where m*I is the third current provided to the first transistor 208.

The instrumentation amplifier amplifies the difference of the first potential VBE1 216 and the second potential VBE2 218 to generate a first amplified voltage. The first amplified voltage ΔVBE1 is defined as $$\Delta VBE1 = A_V * (VBE1 - VBE2) \quad (7)$$

$$\Delta VBE1 = A_V * \eta \frac{kT}{q}(\ln(n) - \ln(m)) \quad (8)$$

where, $A_V$ is a gain of the instrumentation amplifier.

An analog-to-digital converter (ADC) is coupled to the instrumentation amplifier. The ADC receives the first amplified voltage. The ADC converts the first amplified voltage to a first digital code. In one example, when the ADC is a 10 bit ADC, the first digital code is represented as $$\text{Code}(1) = 1023 * \frac{\Delta VBE1}{VREF} \quad (9)$$

where, VREF is a reference voltage received by the ADC.

The instrumentation amplifier amplifies the difference of the first potential VBE2 and the third potential VBE3 to generate a second amplified voltage. The second amplified voltage ΔVBE2 is defined as $$\Delta VBE2 = A_V * (VBE2 - VBE3) \quad (10)$$

$$\Delta VBE2 = A_V * \eta \frac{kT}{q}(\ln(m)) \quad (11)$$

The ADC receives the second amplified voltage. The ADC converts the second amplified voltage to a second digital code. In one example, when the ADC is a 10 bit ADC, the second digital code is represented as $$\text{Code}(2) = 1023 * \frac{\Delta VBE2}{VREF} \quad (12)$$

The analog control block sums the first digital code and the second digital code to measure a local temperature. In one example, a look-up table is used to calibrate the sum of the digital codes and the local temperature. The local temperature is a temperature of a region in which the temperature sensor is placed. When the temperature sensor is coupled to a digital block, the local temperature measured by the analog control block is the local temperature of the digital block.

Figure 7:
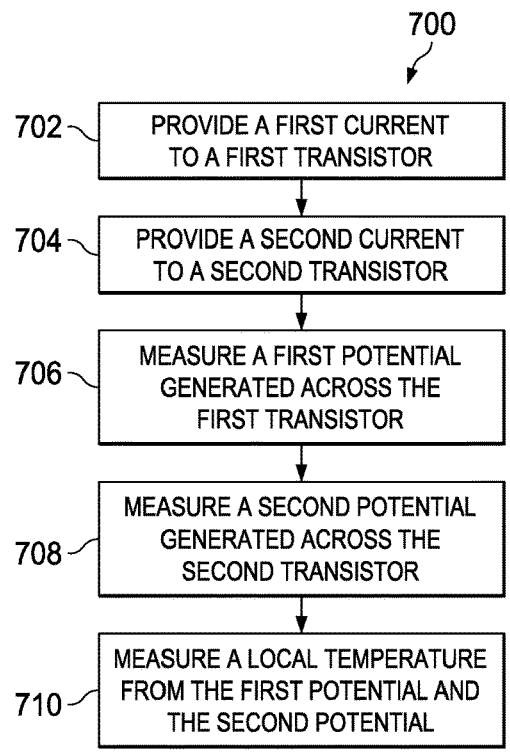
FIG. 7 is a flowchart illustrating a method of sensing temperature, according to an embodiment.

FIG. 7 is a flowchart 700 illustrating a method of sensing temperature, according to an embodiment. At step 702, a first current is provided to a first transistor, and at step 704, the second current is provided to a second transistor. In temperature sensor 200, the first current source 202 pumps a first current in the first transistor 208, and the second current source 204 pumps a second current in the second transistor 212.

At step 706, a first potential is generated across the first transistor. A first potential VBE1 216 is generated across the first transistor 208. The first potential VBE1 216 is generated across the emitter terminal 208e and the base terminal 208b of the first transistor 208. At step 708, a second potential is generated across the second transistor. A second potential VBE2 218 is generated across the second transistor 212. The second potential VBE2 218 is generated across the emitter terminal 212e and the base terminal 212b of the second transistor 212.

At step 710, a local temperature is measured from the first potential and the second potential. A local temperature is measured from the first potential VBE1 216 and the second potential VBE2 218. In one example, the analog control block similar to the analog control block 120 is used to measure the local temperature from the first potential VBE1 216 and the second potential VBE2 218. The local temperature is a temperature of a region in which the temperature sensor 200 is placed. When the temperature sensor 200 is coupled to a digital block, the temperature sensor 200 is used to measure the local temperature of the digital block.

The first transistor and the second transistor, in one example, are diode-connected PNP transistors which are designed as standard core cell. A temperature sensor having the first transistor and the second transistor is designed as a digital cell.

Figure 8:
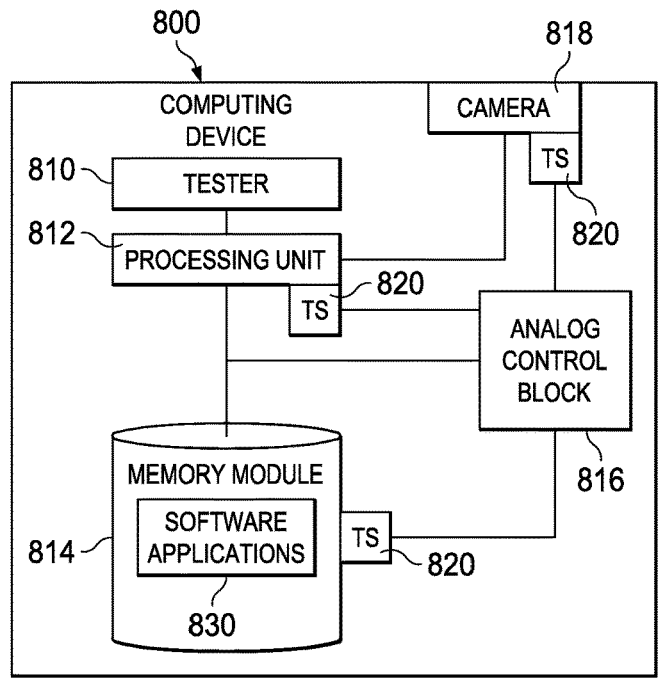
FIG. 8 illustrates a computing device, according to an embodiment.

FIG. 8 illustrates a computing device 800, according to an embodiment. The computing device 800 is, or is incorporated into, a mobile communication device, such as a mobile phone, a personal digital assistant, a transceiver, a personal computer, or any other type of electronic system. The computing device 800 may include one or more additional components known to those skilled in the relevant art and are not discussed here for simplicity of the description.

In some embodiments, the computing device 800 comprises a megacell or a system-on-chip (SoC) which includes a processing unit 812 such as a CPU (Central Processing Unit), a memory module 814 (e.g., random access memory (RAM)) and a tester 810. The processing unit 812 can be, for example, a CISC-type (Complex Instruction Set Computer) CPU, RISC-type CPU (Reduced Instruction Set Computer), or a digital signal processor (DSP).

The memory module 814 (which can be memory such as RAM, flash memory, or disk storage) stores one or more software applications 830 (e.g., embedded applications) that, when executed by the processing unit 812, performs any suitable function associated with the computing device 800. The tester 810 comprises logic that supports testing and debugging of the computing device 800 executing the software applications 830.

For example, the tester 810 can be used to emulate a defective or unavailable component(s) of the computing device 800 to allow verification of how the component(s), were it actually present on the computing device 800, would perform in various situations (e.g., how the component(s) would interact with the software applications 830). In this way, the software applications 830 can be debugged in an environment which resembles post-production operation.

The processing unit 812 typically comprises memory and logic which store information frequently accessed from the memory module 814. A camera 818 is coupled to the processing unit 812. The computing device 800 includes an analog control block 816. The analog control block 816 is coupled to the processing unit 812 and the memory module 814. The computing device 800 also includes a plurality of temperature sensors illustrated as TS 820. The plurality of temperature sensors are coupled to the analog control block 816.

Each temperature sensor (TS) 820 of the plurality of temperature sensors is designed as a standard digital cell. This enables to place a temperature sensor (TS) 820 at hot spots. Hot spots are the hot regions on the computing device 800 where a large amount of heat is generated by digital blocks such as processing unit 812 and the memory module 814.

In one example, at least one temperature sensor (TS) 820 of the plurality of temperature sensors includes a first transistor and a second transistor. On one version, each of the first transistor and the second transistor is a diode-connected PNP transistor. The first transistor is coupled to a first current source, and the second transistor is coupled to a second current source. A local temperature is measured from a first potential generated across the first transistor and from a second potential generated across the second transistor.

The local temperature is a temperature of a region in which the temperature sensor (TS) 820 is placed. The analog control block 816 measures the local temperature from the first potential and the second potential generated across a temperature sensor (TS) 820. The diode-connected PNP transistors are designed as standard core cell which allows easy integration with the one or more digital blocks. The temperature sensor (TS) 820 is designed as a standard digital cell that uses only low level metals. This relaxes the routing constraints of the temperature sensor (TS) 820. The design of the temperature sensor (TS) 820 as standard digital cell makes it compatible with digital placement and routing tools.

In addition, the temperature sensor (TS) 820 is small in size which allows placement of the temperature sensor (TS) 820 at hot spots. Also, the temperature sensor (TS) 820 can be integrated with a digital block with ease. Thus, the temperature sensor (TS) 820 provides an accurate measurement of the local temperature. A large number of these temperature sensors can be used to generate a heat map of the computing device 800.

The temperature sensor (TS) 820 does not require a separate power supply. The first potential and the second potential generated at the temperature sensor (TS) 820 are provided to the analog control block 816. The analog control block 816 uses a difference in the first potential and the second potential to generate a digital code. The digital code is used to calculate the local temperature. In one example, a look-up table is used to calibrate the digital code and the local temperature.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A circuit comprising:
  an analog control block comprising a first current source and a second current source; and
  a plurality of temperature sensors coupled to the first current source of the analog control block and the second current source of the analog control block, at least one temperature sensor of the plurality of temperature sensors comprising:
    a first transistor coupled to the first current source of the analog control block and a first resistor; and
    a second transistor coupled to the second current source of the analog control block, a second resistor, and to the first transistor, wherein the analog control block is configured to measure a local temperature from a first potential generated across the first transistor and from a second potential generated across the second transistor.

2. The circuit of claim 1, wherein each temperature sensor of the plurality of temperature sensors is designed as a standard digital cell.

3. The circuit of claim 1, wherein each of the first transistor and the second transistor is a diode-connected PNP transistor.

4. The circuit of claim 3, wherein the first potential is generated across a base terminal and an emitter terminal of the first transistor.

5. The circuit of claim 3, wherein the second potential is generated across a base terminal and an emitter terminal of the second transistor.

6. The circuit of claim 3, wherein the base terminal of the first transistor is coupled to the base terminal of the second transistor.

7. The circuit of claim 3, wherein a collector terminal of each of the first transistor and the second transistor is coupled to a ground terminal.

8. The circuit of claim 1 further comprising one or more digital blocks, and a first temperature sensor of the plurality of temperature sensors is coupled to a first digital block of the one or more digital blocks, and the analog control block is configured to measure the local temperature of the first digital block from the first potential and the second potential generated across the first temperature sensor.

9. The circuit of claim 1, wherein the analog control block further comprises:
 an instrumentation amplifier configured to amplify a difference of the first potential and the second potential to generate an amplified voltage; and
 an analog-to-digital converter (ADC) coupled to the instrumentation amplifier, the ADC configured to convert the amplified voltage into a digital code.

10. A method of sensing temperature comprising:
 providing, by a first current source in an analog control block to a temperature sensor, a first current to a first transistor, wherein the first transistor is coupled to a first resistor;
 providing, by a second current source in the analog control block to the temperature sensor, a second current to a second transistor, wherein the second transistor is coupled to a second resistor;
 measuring, by the temperature sensor, a first potential generated across the first transistor;
 measuring, by the temperature sensor, a second potential generated across the second transistor; and
 measuring, by the temperature sensor, a local temperature from the first potential and the second potential.

11. The method of claim 10, wherein measuring the local temperature further comprises:
 amplifying a difference of the first potential and the second potential to generate an amplified voltage; and
 converting the amplified voltage to a digital code.

12. The method of claim 10 further comprising designing the first transistor and the second transistor as part of a digital cell.

13. The method of claim 10, wherein each the first transistor and second transistor is a diode-connected PNP transistor.

14. The method of claim 10, wherein measuring the first potential further comprises measuring a potential generated across a base terminal and an emitter terminal of the first transistor.

15. The method of claim 10, wherein measuring a second potential further comprises measuring a potential generated across a base terminal and an emitter terminal of the second transistor.

16. A method of sensing temperature comprising:
 providing, by a first current source in an analog control block to a temperature sensor, a first current to a first transistor, wherein the first transistor is coupled to a first resistor;
 providing, by a second current source in the analog control block to the temperature sensor, a second current to a second transistor, wherein the second transistor is coupled to a second resistor;
 measuring, by the temperature sensor, a first potential generated across the first transistor;
 measuring, by the temperature sensor, a second potential generated across the second transistor;
 amplifying a difference of the first potential and the second potential to generate a first amplified voltage;
 converting, by the temperature sensor, the first amplified voltage to a first digital code;
 providing, by the temperature sensor, a third current to the first transistor;
 measuring, by the temperature sensor, a third potential generated across the first transistor;
 amplifying, by the temperature sensor, a difference of the third potential and the second potential to generate a second amplified voltage;
 converting, by the temperature sensor, the second amplified voltage to a second digital code; and
 measuring, by the temperature sensor, a local temperature by summing the first digital code and the second digital code.

17. The method of claim 16 further comprising designing the first transistor and the second transistor as part of a digital cell.

18. The method of claim 16, wherein each the first transistor and second transistor is a diode-connected PNP transistor.

19. A computing device comprising:
 a processing unit;
 a memory module coupled to the processing unit;
 an analog control block coupled to the processing unit and the memory module, wherein the analog control block comprises a first current source and a second current source; and
 a plurality of temperature sensors coupled to the first current source of the analog control block and the second current source of the analog control block, at least one temperature sensor of the plurality of temperature sensors comprising:
  a first transistor coupled to the first current source of the analog control block and a first resistor; and
  a second transistor coupled to the second current source of the analog control block, a second resistor, and to the first transistor, wherein the analog control block is configured to measure a local temperature from a first potential generated across the first transistor and from a second potential generated across the second transistor.

20. The computing device of claim 19, wherein each temperature sensor of the plurality of temperature sensors is designed as a standard digital cell.

* * * * *